(12) United States Patent
Horn

(10) Patent No.: US 6,178,237 B1
(45) Date of Patent: *Jan. 23, 2001

(54) TELECONFERENCING AUDIO BRIDGE

(75) Inventor: David N. Horn, Rumson, NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/997,975

(22) Filed: Dec. 24, 1997

Related U.S. Application Data

(63) Continuation of application No. 08/648,642, filed on May 16, 1996, which is a continuation of application No. 08/236,790, filed on Apr. 29, 1994, now abandoned.

(51) Int. Cl.$^7$ ....................................................... H04M 3/56
(52) U.S. Cl. ........................... 379/202; 379/203; 379/204
(58) Field of Search ..................................... 379/202, 203, 379/204, 205, 206, 158; 370/260, 261, 262, 263

(56) References Cited

U.S. PATENT DOCUMENTS

| | | |
|---|---|---|
| 4,163,871 | 8/1979 | Maggi . |
| 4,215,247 | 7/1980 | Lambert . |
| 4,276,639 | 6/1981 | Fukuda et al. . |
| 4,359,603 | 11/1982 | Heaton . |
| 4,499,578 | 2/1985 | Marouf et al. . |
| 4,558,180 | 12/1985 | Scordo . |
| 4,644,530 | 2/1987 | Phiet . |
| 4,648,089 | 3/1987 | Hsing . |
| 4,658,398 | 4/1987 | Hsing . |
| 4,710,917 | 12/1987 | Tompkins et al. . |
| 4,712,231 | 12/1987 | Julstrom . |
| 4,716,585 | 12/1987 | Tompkins et al. . |
| 4,730,306 | 3/1988 | Uchida . |
| 4,734,934 | 3/1988 | Boggs et al. . |
| 5,034,947 | 7/1991 | Epps . |
| 5,054,021 | 10/1991 | Epps . |
| 5,113,431 | 5/1992 | Horn . |
| 5,260,938 | 11/1993 | Hofmann . |
| 5,260,941 | 11/1993 | Wilder et al. . |
| 5,343,193 | 8/1994 | Shoda et al. . |
| 5,420,860 | 5/1995 | Stevens et al. . |
| 5,425,094 | 6/1995 | Noda . |
| 5,457,740 | 10/1995 | Noda . |
| 5,533,112 | 7/1996 | Danneels . |

FOREIGN PATENT DOCUMENTS 62-115954    5/1987   (JP) .

OTHER PUBLICATIONS

L. Baranyai, "Digital Multipoint Teleconferencing for Special Service Circuits," IEEE Global Telecommunications Conference–Globecom 83, vol. 1, pp. 548–553, Nov., 28, 1983–Dec. 1, 1983.

D.N. Horn, et al., "A Versatile Audio Bridge for Multimedia Conferencing," Supercom ICC 94, May 1–5, 1994, New Orleans, pp. 1754–1762.

Primary Examiner—Krista Zele
Assistant Examiner—William J. Deane, Jr.

(57) ABSTRACT

An arrangement for a teleconferencing bridge allows one or more users to control at least one characteristic of at least some of the input signals received by the bridge, such that the output signals received by each user in a teleconference is a user-controlled combination of all the input signals, including the changed input signals. The arrangement allows a rich set of audio bridging features to be provided cost-effectively. Those features include subconferencing, monitoring, whispering, muting, complex gain control, and pseudo stereo.

23 Claims, 9 Drawing Sheets

FIG. 8

| | INPUTS | | | | | | |
|---|---|---|---|---|---|---|---|
| | $I_1$ | $I_2$ | $I_3$ | $I_4$ | | $I_j$ | $I_n$ |
| $O_{1L}$ | 0 | 1 | .7 | 0 | | | |
| $O_{1R}$ | 0 | 0 | .7 | 1 | | | |
| $O_{2L}$ | 1 | 0 | .7 | 0 | | | |
| $O_{2R}$ | 0 | 0 | .7 | 1 | | | |
| $O_{3L}$ | 1 | .7 | 0 | 0 | | | |
| $O_{3R}$ | 0 | .7 | 0 | 1 | | | |
| $O_{4L}$ | 1 | .7 | 0 | 0 | | | |
| $O_{4R}$ | 0 | .7 | 1 | 0 | | | |
| $O_m$ | | | | | | | |

OUTPUTS

TELECONFERENCING AUDIO BRIDGE

This is a continuation of application Ser. No. 08/648,642 filed May 16, 1996, now abandoned, which in turn is a continuation of application Ser. No. 08/236/790, filed Apr. 29, 1994, now abandoned. The entire disclosures of the prior applications are hereby incorporated by reference.

TECHNICAL FIELD

This invention relates to teleconferencing. More specifically, this invention relates to a method and a system that afford users more control over a teleconferencing setup.

BACKGROUND

Teleconferencing permits more than two participants separated in time and space to communicate over telephone facilities using terminal equipment and/or bridging devices or services, such as the AT&T Alliance® Service. Typically, bridging services offer either a so-called "meet-me" service to which participants dial in to join a teleconference or a dial-out service in which, an operator/originator calls the participants of a teleconference. Bridging services connect each participant on a point-to-point basis to a bridging device which links the multiple parties into a teleconference. In spite of the multiple social and economic benefits of teleconferencing, its use, however, has been hampered by the paucity of features of the bridging devices and users' lack of control over transmission and reception of audio signals to, and from particular participants, respectively.

Aiming to provide a solution to that problem, Horn, in U.S. Pat. No. 5,113,431, issued May 12, 1992, disclosed a system that allows a teleconferencing user to select on a dynamic basis, particular participants to whom the user can listen or talk during a teleconference. The Horn system affords users some degree of control of the teleconference set-up. The Horn system does not provide a comprehensive solution to control the amplitude of audio signals generated by the participants of the teleconference.

SUMMARY OF THE INVENTION

The present invention is directed to a teleconferencing bridging arrangement in which at least one participant (or user) in a teleconference is allowed to control at least one characteristic of input signals coupled through the bridge, such that the output signals received by that participant in a teleconference is a selected combination of the input signals, including the changed input signals, from all the participants.

In an embodiment of the invention, a communications bridge is comprised of N input paths and M output paths that define a logical matrix, in which signal inputs of all participants in a conference are added to form composite output signals delivered to each participant. To avoid feedback and instability, the input signals from a participant of the teleconference are suppressed in the composite output signals delivered to that participant. Therefore, each participant in the teleconference receives a different sum of input signals. In the architecture of the bridge, a gain element (G) is associated with each crosspoint of the n input paths and m output paths such that the composite output signals (O) delivered to a user i, can be represented by the equation:

$$O_i = \sum_{j=1}^{j=n} I_j G_{ij},$$

where I is the input signal from a participant. In other words, each output from the bridge consists of a mix of all input signals with each input multiplied by a participant-selected parameter (i.e., gain element). Thus, by allowing each participant to vary that parameter for the input signals associated with one or more participants, a rich set of audio bridging features can be provided. These features include subconferencing, whispering, muting, monitoring, complex gain control, and pseudo stereo.

Advantageously, the audio bridging features of the invention can be used in a multimedia conferencing environment.

BRIEF DESCRIPTION OF THE DRAWING

FIGS. 5, 6, 7 and 8 are configurations of the input/output matrix of FIG. 3 arranged to provide various audio bridging features.

DETAILED DESCRIPTION

Figure 1:
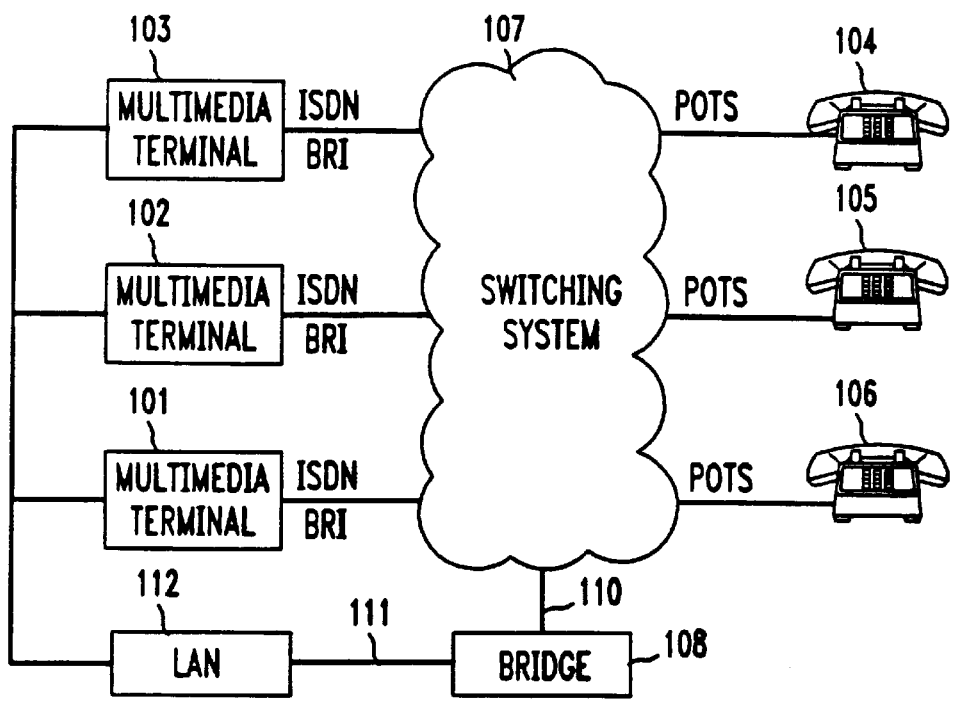
FIG. 1 shows a block diagram of a communications network which includes a teleconferencing communications bridge designed according to the principles of the invention.

FIG. 1 illustrates, in block diagram form, a communications network which includes a teleconferencing audio bridge designed according to the principles of the invention. The communications network of FIG. 1 is arranged to support concurrently a) multiparty, multimedia conferences for digital user terminals, and b) single medium audio teleconferences for analog telephone sets. In an illustrative multimedia application, digitized voice signals are mixed by a bridge 108 which also multicasts digitized video and data signals to multimedia terminals 101, 102 and 103 via switching system 107. Similarly, audio signals received from terminals 101–103 and telephone sets 104, 105 and 106 (hereinafter terminals 104–106) are mixed for transmission to participants of an audio teleconference. The central nerve of the communications network of FIG. 1 is switching system 107, which may be either one switch, such as a PBX, or a set of interconnected central office (CO) switches within one or more networks. Thus, bridge 108 can be simultaneously connected to several different networks, thereby facilitating interworking among users of those various networks.

Switching system 107 switches incoming audio signals from user terminals 101 to 106 to bridge 108, and switches audio signals from bridge 108 to user terminals 101 to 106. Specifically, switching system 107 converts analog audio signals received from telephone sets 104, 105, 106 to digital format and multiplexes those signals with digital audio signals received from multimedia terminals 101 to 103 for delivery to bridge 108 over facility 110. Bridge 108 is also connected to a Local Area Network (LAN) 112 via a data facility 111. In multimedia applications, LAN 112 can be used in conjunction with bridge 108 to allow, for example, multimedia terminals 101, 102 and 103 to display a single document stored in a server of LAN 111. Multimedia terminals 101 to 103 maybe, for example, integrated workstations and digital telephone sets that are capable of receiving and transmitting digital signals carrying voice, data, and video information. In multimedia applications, bridge 108 is used as an audio, data and video bridge. Although the rest of this specification emphasizes the audio features of bridge 108, it is to be understood that bridge 108 can be used as a data and video bridge as well.

Figure 2:
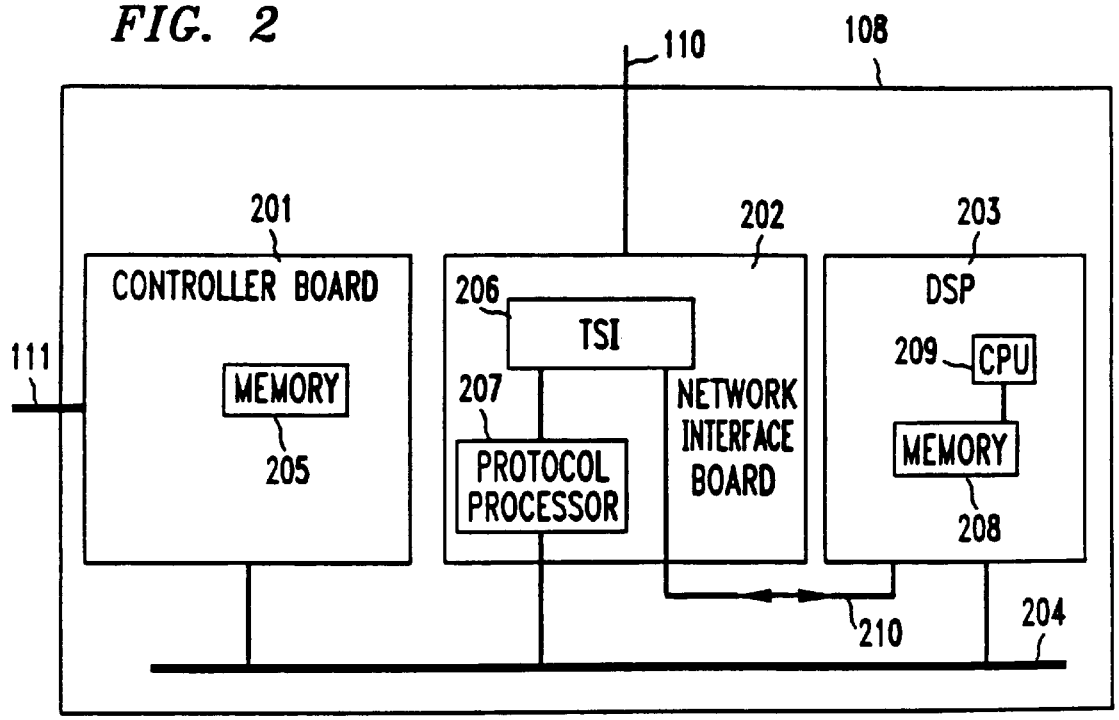
FIG. 2 depicts an implementation of a teleconferencing communications bridge embodying the principles of this invention.

FIG. 2 depicts a teleconferencing audio bridge 108 arranged in accordance with the principles of the invention. Bridge 108 is comprised of a network interface 202 which receives incoming signals via facility 110, routes audio signals to a DSP 203 via a full duplex serial link 210, and control data signals to a controller 201 via a bus 204. Thus, network interface 202 is the point of access and egress for audio communication and control data signals processed in bridge 108. Specifically, network interface 202 receives incoming signals via facility 110, determines where to route those signals and performs signal encoding and framing, if needed.

At the heart of network interface 202 is a time slot interchanger (TSI) 206, which is a space/time switch arranged to route to (and receive from) DSP 203 audio signals transmitted over the channels within facility 110. Control data received by time slot interchanger 206, is forwarded to the protocol processor 207 which packetizes and de-packetizes the control data for transmission to controller 201 via bus 204.

DSP 203 is a signal processor comprised of a central processing unit (CPU) 209 and a memory 208 which stores the software for implementing the audio bridging finction, including the matrix multiplication, described in further detail below. Memory 208 includes various input and output buffers and a gain matrix buffer described in further detail below. The functions of DSP 203 may be implemented using, for example, an AT&T DSP32C digital signal processor.

Controller 201 is responsible for processing all control signal data received in bridge 108. Control signal data may be received in-band through a bearer channel (B) of an ISDN Basic Rate Interface (BRI) via facility 110 or via data facility 111 that connects bridge 108 to Local Area Network (LAN) 112. As part of its control signal processing functions, controller 201 accepts signaling messages from users and sets the gain elements for the matrix multiplication function performed in DSP 203. Controller 201 includes a memory 205, which stores conference control software for calculating the value of the gain elements to implement a specific conference function. Once a gain matrix is defined, controller 201 loads that gain matrix (described in further detail below) into the gain matrix buffer of memory 208 in the DSP 203.

Figure 3:
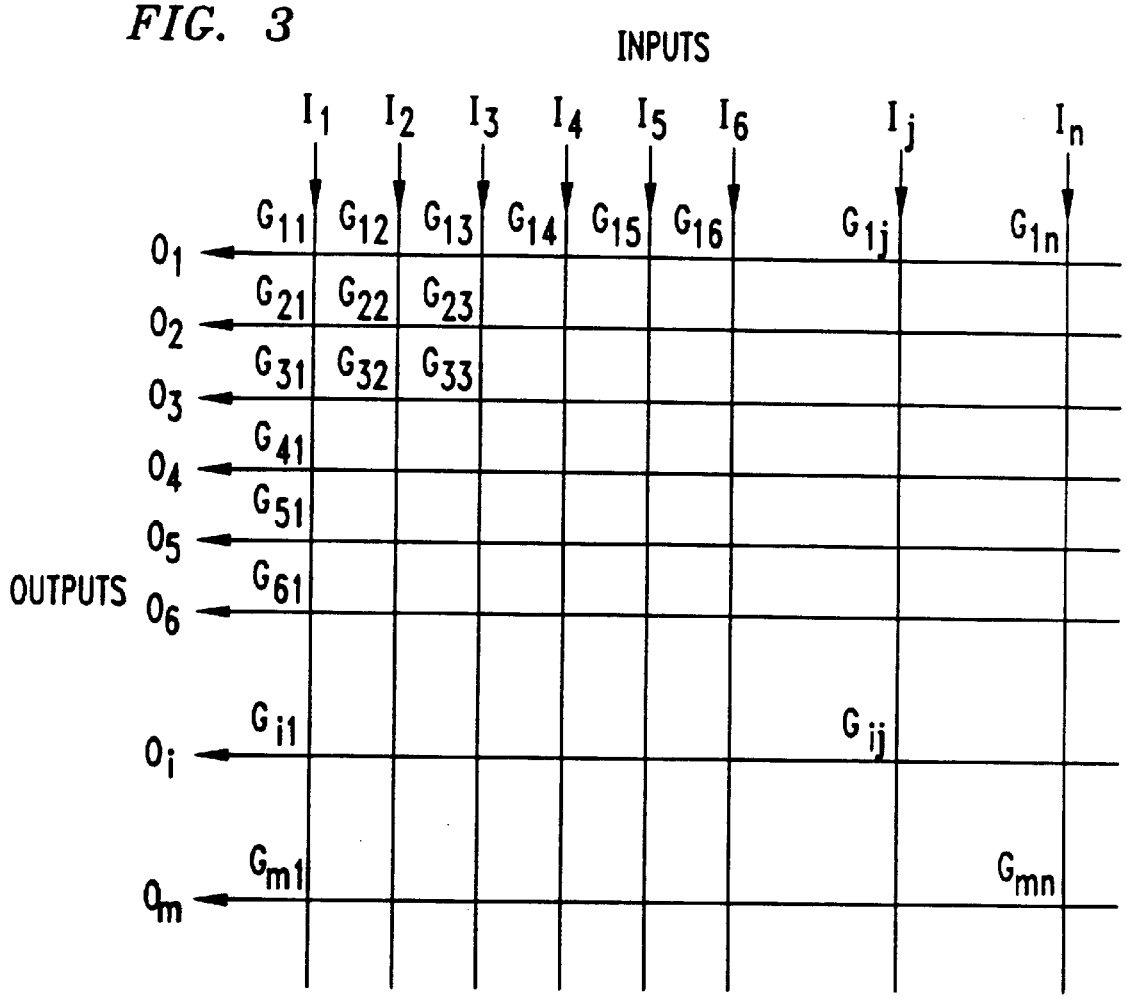
FIG. 3 is an illustrative representation of a matrix of input and output signals arranged in accordance with the principles of the invention.

FIG. 3 is an illustrative representation of a matrix of input and output signals arranged in accordance with the principles of the invention.

The matrix of FIG. 3 shows n audio (e.g., speech) inputs $I_j$ ($0 \leq j \leq n$) coming in on the "talking" columns, and m speech outputs $O_i$ ($0 \leq i \leq m$) leaving on the "listening" rows. At each cross-point of the matrix is a gain element $G_{ij}$. The output signal O on a listening row (or bridging function) can be expressed as:

$$O_i = \sum_{j=1}^{j=n} I_j G_{ij}.$$

In other words, the composite output signal delivered to each participant $O_i$ of the teleconference is a sum of all the speech inputs $I_j$ received by the bridge, with each speech input modified by an arbitrary gain element ($G_{ij}$) specified by a user or originator of the conference. Another way of describing this bridging function is the matrix vector multiplication [O]=[I]*[G]. Thus, by allowing the participant(s) (or an originator) of the teleconference to select the values of the gain element(s) associated with one or more particular participants, the amplitude of the audio signals received by one or more participants can be set according to that originator/participant's preference. For example, gain elements for $G_{11}$, $G_{22}$, $G_{33}$, are set to zero to prevent feedback of a participants' own audio signal. This insures stability in the composite output signals received by participants 1, 2, and 3.

Once output signals are derived in DSP 203, they are forwarded via serial link 210 to time slot interchanger 206, which demultiplexes the composite outgoing signals for delivery to the different participants in the conference. In general, values of the gain elements (G) are restricted to $0 \leq G \leq 1$ in order to limit clipping of the output signals. Gain elements (G) may take values greater than one to amplify weak input signals.

The bridge of FIG. 2 can be implemented in analog or digital form. For example, an analog bridge could be implemented by modifying the analog bridge described in the aforementioned Horn patent, which is incorporated herein by reference. The Horn analog bridge uses a) an operational amplifier virtual earth summing junction to implement each row, and b) CMOS analog switches to implement what can be considered as the equivalent of gain elements restricted to values of either one (1) or zero (0). Modification of that bridge would include replacing the CMOS analog switches (implementing the gain elements) with different analog switches that are capable of assuming discrete values, as opposed to the binary values of one or zero only. For example, multiplying Digital-to-Analog converters could also be used to affect the value of the gain elements.

As is well-known to those skilled in the art, a Digital-to-Analog converter provides an analog output (O) equal to a digital input (I) multiplied by an analog reference Voltage $V_{ref}$, i.e., $O=I*V_{ref}$. By using the audio input to the bridge to drive the voltage reference input of the Digital-to-Analog converter, and taking the output to a summing junction to drive the output from the bridge, a digital signal applied to the Digital-to-Analog converter can be used to control the gain element in the bridge.

In an illustrative embodiment useful for digital audio signals, the matrix of FIG. 3 is a virtual matrix. The virtual matrix does not physically exist but is actually represented by a gain matrix stored in memory 208 where each data item represents a crosspoint gain element $G_{ij}$.

Figure 4:
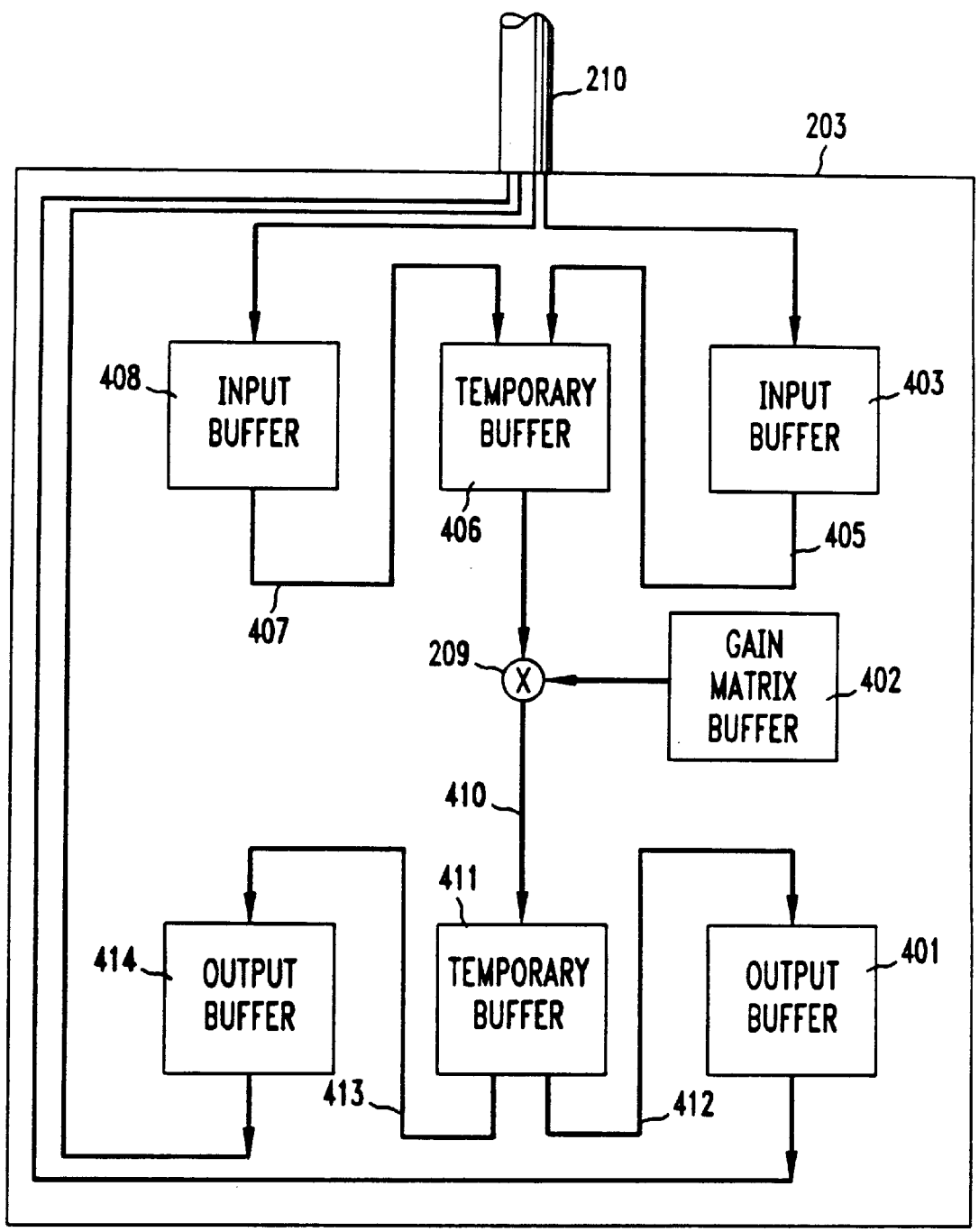
FIG. 4 depicts a Digital Signal Processor (DSP) that processes input signals using the input/output matrix of FIG. 3.

An implementation of the DSP 203 of FIG. 3 is shown in FIG. 4. In an implementation of the principles of the invention, digitized input speech signals come into the DSP 203 via serial link 210. The digitized speech for each input signal is illustratively comprised of a plurality of 125 microsecond samples (a sample period at the 8 KHz sample rate). The input signal samples are represented as an 8-bit mu-law compressed digital signal word. An input frame includes 32 digital signals words representing 32 input signals. Frames are shifted in and out of the DSP 203 under Direct Memory Access (DMA) control using a ping-pong buffering scheme. Detailed information on the ping-pong buffering scheme can be found in the AT&T WE DSP32C Digital Processor Information Manual published in January, 1990 by the AT&T Document Management Organization.

During each frame period, the incoming frame is temporarily stored in an input buffer 408 to be thereafter converted to a 32-bit floating point format and Transferred to buffer 406 (via) line 407) for temporary storage. Then, CPU 209 performs a matrix multiplication between the first 32 words of the input frame and an illustrative gain matrix 32 by 32 previously loaded in gain matrix buffer 402 by controller 201.

The resulting 32 by 1 output matrix (which is an output frame) is then converted back to mu-law Pulse Code Modulation (PCM) signals that are transferred from gain matrix 402 to buffer 411 via line 410 and later successively transferred to output buffers 401 and 414, via lines 412 and 413, respectively. Subsequently, the PCM signals are transmitted to serial link 210. During the next frame, the same operation takes place on the alternate set of buffers, i.e., input buffer 403 and output buffer 401, while serial input/output takes place by DMA simultaneously. Specifically, the incoming frame is transferred for temporary storage to buffer 404 (via line 405) to be thereafter converted to a 32-bit floating point format for the matrix multiplication operation described above.

Advantageously, this arrangement allows conference control and matrix manipulation to be left entirely to controller 201 (which receives control signals via user interfaces described below), while DSP 203 performs the CPU-intensive functions of data movement, conversion, and matrix multiplication.

The basic bridge of FIG. 3 can be used to implement several practical audio bridging services.

Figure 5:
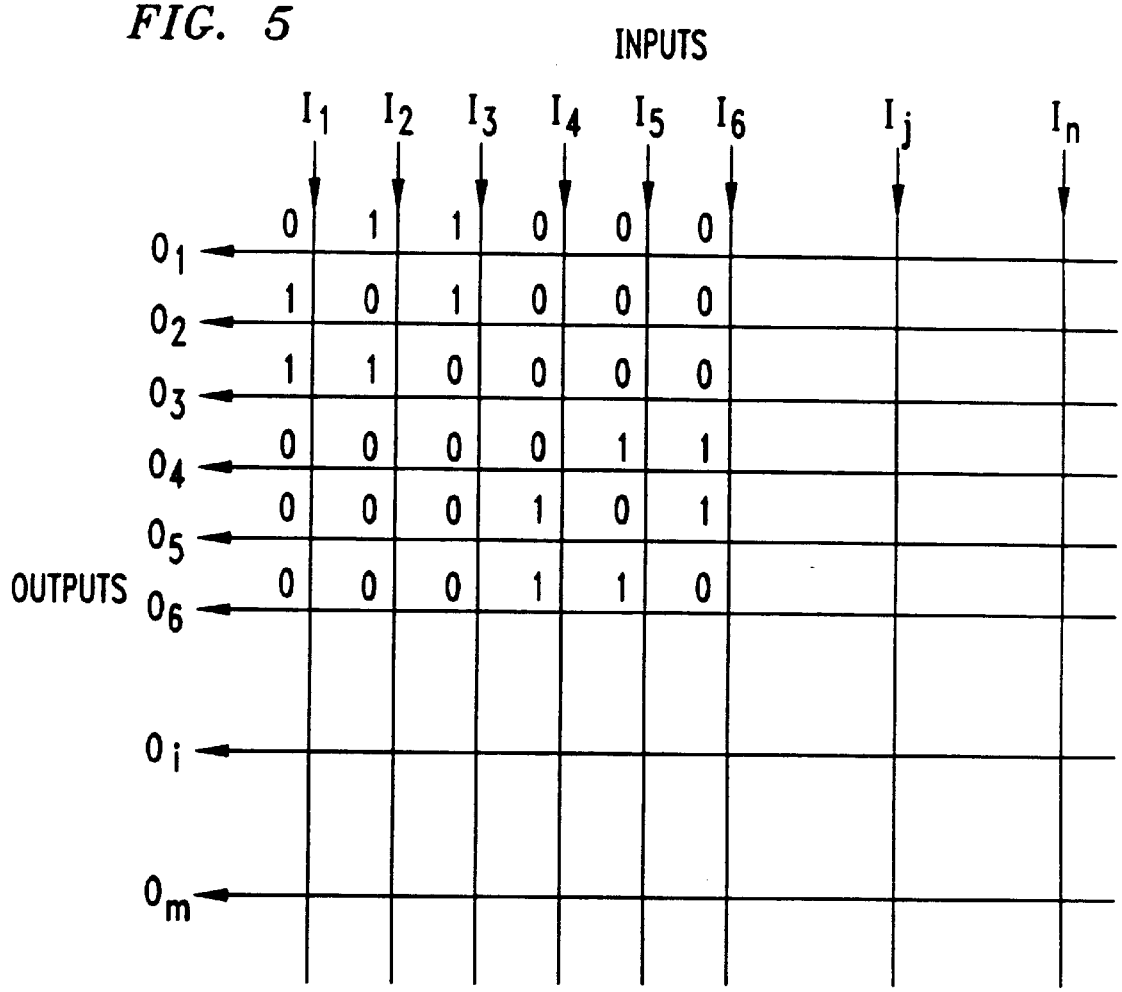

FIG. 5 shows an implementation of the basic bridge of FIG. 3 in which two independent conferences are carried out using a single bridge.

In the matrix of FIG. 5, users 1, 2, and 3 are participating in one conference, while users 4, 5, and 6 are participating in a separate and distinct other conference. Although the illustrative matrix of FIG. 5 shows only two conferences being carried simultaneously and independently, it is to be understood that a single matrix can implement any number of independent conferences, subject to the total number of ports not exceeding the size of the matrix.

Figure 6:
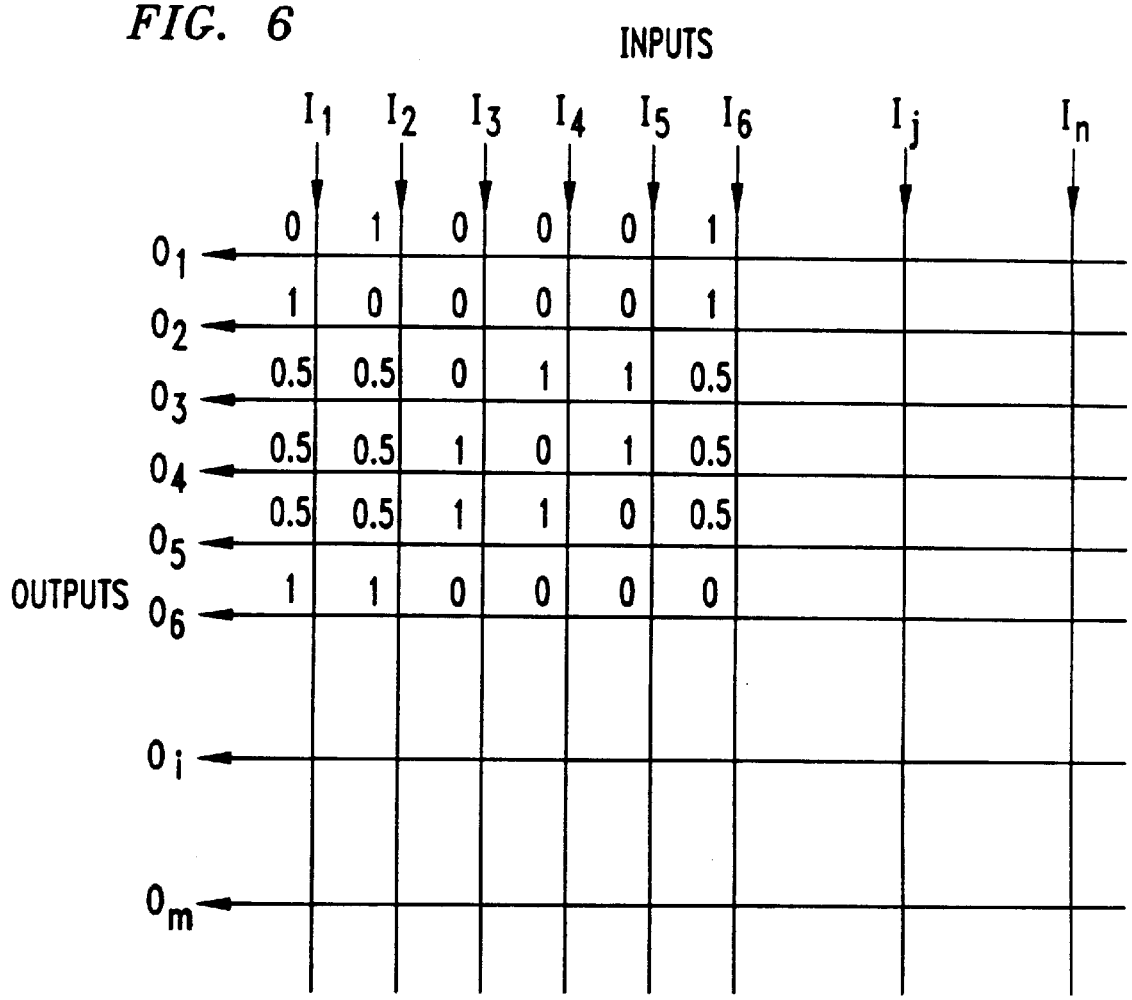

FIG. 6 shows the illustrative matrix of FIG. 3 in which, a subconference is held as a subset of a larger conference. In the matrix of FIG. 6, participants 3, 4, and 5 can talk privately among each other, while they remain able to hear the other participants (1,2,6) of the conference at a reduced level. Note that the other participants (1,2,6) cannot hear the conversation between 3, 4, and 5.

Figure 7:
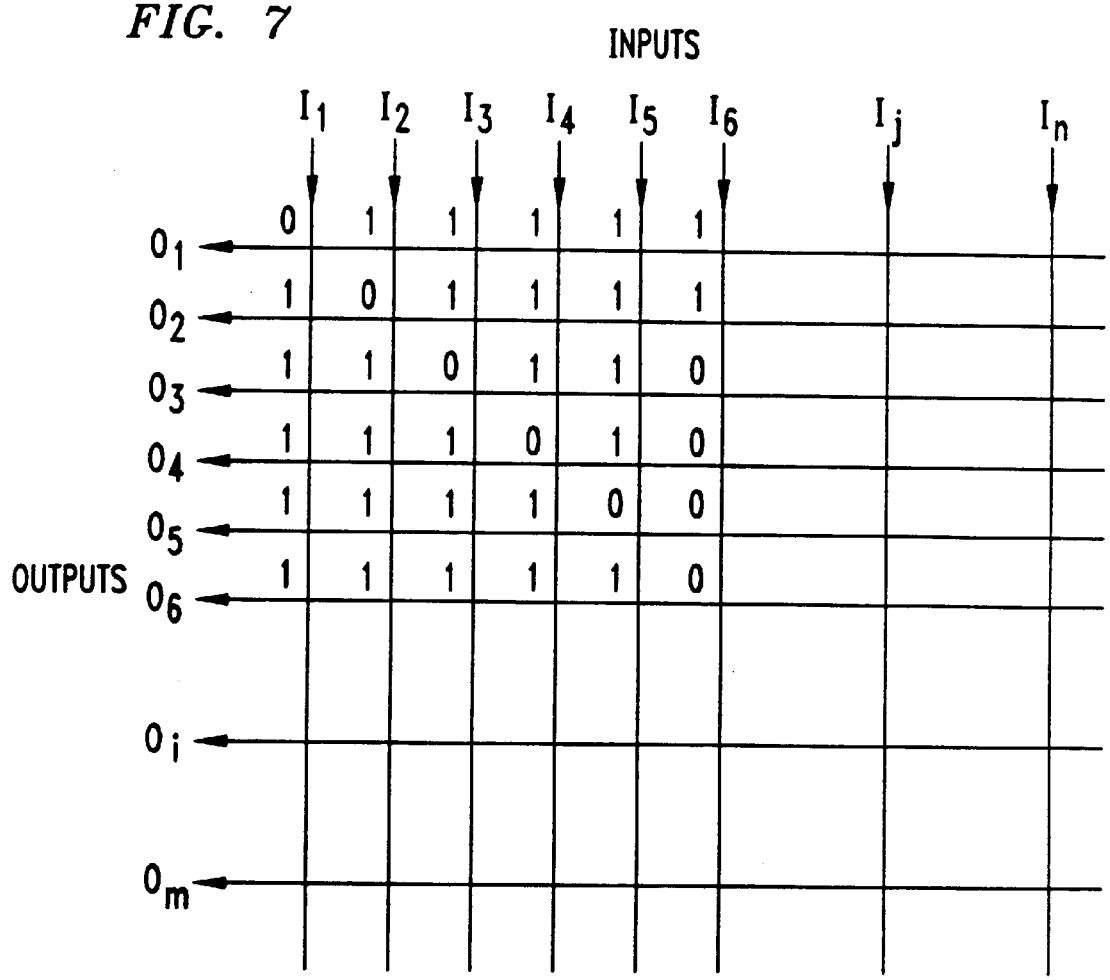

FIG. 7 depicts yet another configuration of the matrix of FIG. 3 in which one participant can carry a private conversation with one or more other participants, without disruption to the remaining participants of the conference. This feature is hereinafter referred to as the "whisper" function because it allows a participant to whisper something to one or more participants privately. The matrix of FIG. 7 illustrates a six party conference in which user 6 is whispering to 1 and 2. This is like an asymmetrical subconference. The parties "whispered to" may choose to reply in private if they so desire, by dynamically setting to 0 the gain elements for their input speech directed to excluded participants.

FIG. 8 shows a configuration of the matrix of FIG. 3 in which each participant gets one input (column) on the matrix and two outputs (rows) i.e., left and right. For each output pair, different inputs are blended into the left and right channels with a different ratio, thereby, providing a different position in the apparent stereo sound-space. This configuration permits a straightforward implementation of the pseudo-stereo feature. The latter gives the impression that each participant's voice in a conference is coming from a different point in space. Implementation of the pseudo stereo feature requires a single input audio channel from each user to the bridge (i.e. a stereo microphone is not required), and two output audio channels back to the users requesting the feature. Participants listen to the conference on stereo headphones or two loudspeakers. Empirical studies have indicated that "pseudo stereo" techniques improve both intelligibility when there are multiple talkers, and improve talker identification.

FIG. 8 shows a four-party conference between A, B, C, and D. Each party hears the other three spread out from left to right in alphabetical order. Note that the value of 0.7 corresponds to half-power, so that each party comes across at the same total power.

Before describing the user interfaces for the bridge of FIG. 2, a discussion of a method to insure conference participants' privacy is in order.

To illustrate the privacy issue, consider the scenario in which user A has set up a whisper channel to user B. A privacy policy is needed to prevent user C from altering the gain matrix to listen to A.

In another example, let us assume that user N has turned down the gain from user M, either because M is coming over too loud or because N does not want to hear M. A private policy is needed to prevent M (or any other party) from changing N preference. Set forth below are the rules of a "privacy policy" and a mechanism with which to enforce these policies.

A first rule allows each user to specify the participant(s) with whom he or she wants to talk and listen. For example, an audio path is set up from A to B only if A wants to talk to B and if B wants to listen to A. In other words, no one can talk or listen to anyone against his or her will.

A second rule prevents any participants from interfering with the conversation between two other participants.

To implement these rules, the Gain Matrix [G] is decomposed into two matrices, the Talk matrix [T], and the Listen matrix [L], so that $G_{ij}=T_{ij}*L_{ij}$. The [T] matrix is binary, with element values of one or zero. The [L] matrix has element values $0 \leq L \leq 1$. Each participant is allowed to specify the values of his/her own column on the Talk matrix, and the values of his/her own row on the Listen matrix. That is, participants can specify who they want to talk to, and at what level they want to hear each other.

Figure 9:
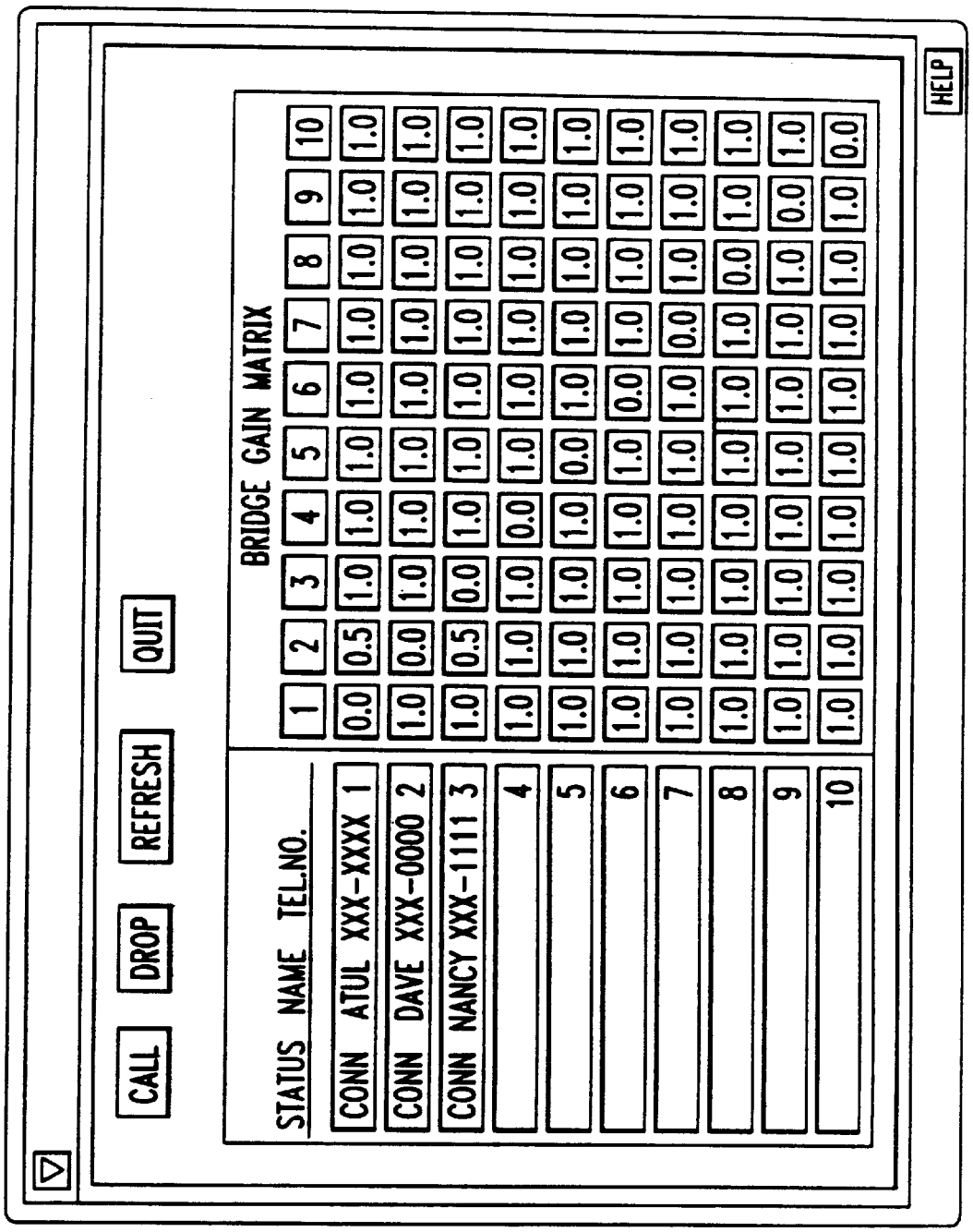
FIGS. 9 and 10 show two illustrative user-interfaces for teleconference participants to control gain elements in the bridge of the invention.
Figure 10:
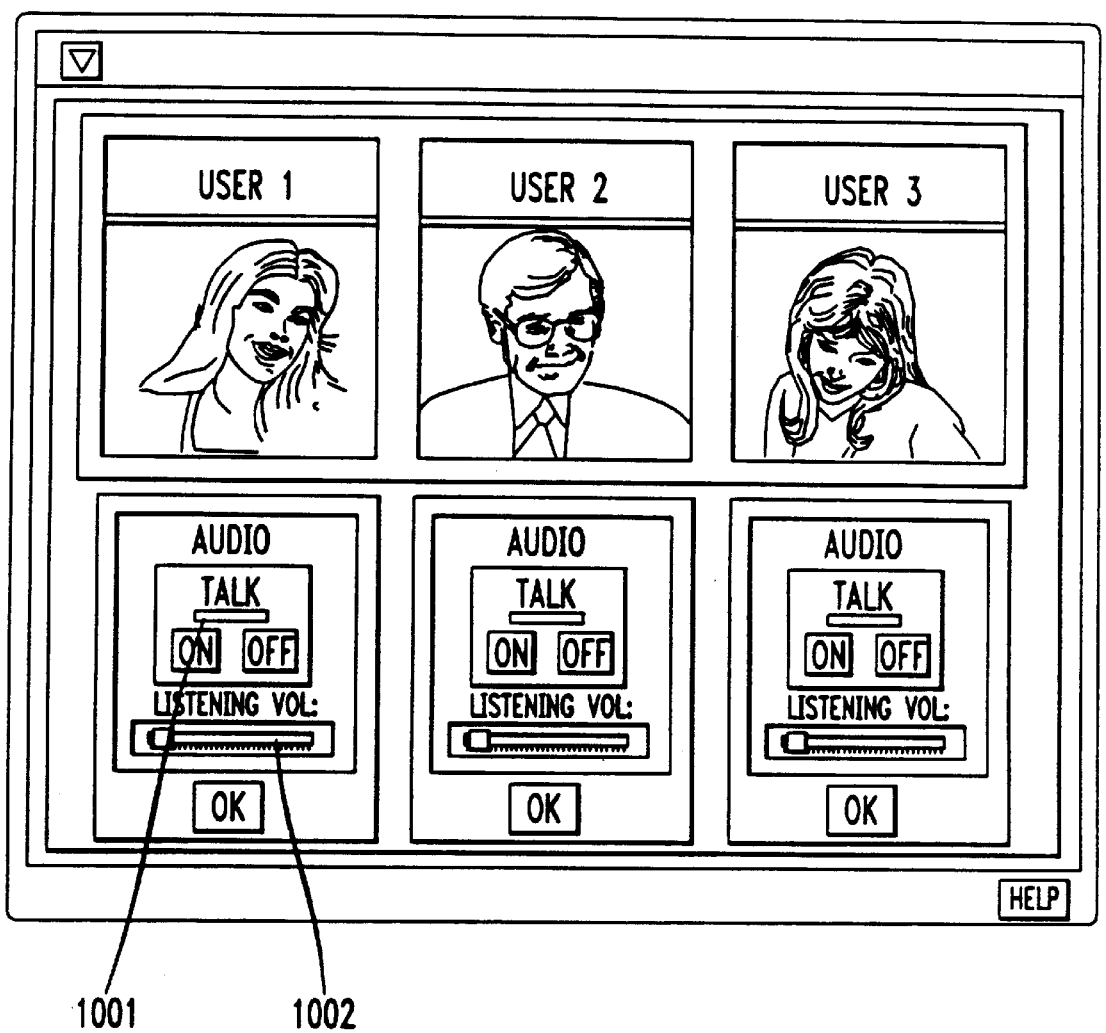

FIGS. 9 and 10 illustrate two user interfaces that allow a user to control the gain elements in the bridge of the invention. The user-interface of FIG. 9 allows the gain elements for signals received by the bridge to be controlled from a single console. The user-interface of FIG. 9 can be used, for example, for conference control in a conducted mode, i.e., the conference being centrally controlled by an originator/operator.

The top left hand corner of FIG. 9 shows a set of call control commands, namely "call", "drop", "refresh" and "quit". These commands allow the originator/operator to a) initiate and drop calls, and b) associate calls, matrix rows and columns, and user names. The rows that are outside the matrix on the left hand side display the status of the call for each participant, the name, and phone number of that participant. The matrix part of FIG. 9 allows the originator/operator to adjust each gain element by illustratively clicking on the desired matrix entry with a mouse of a workstation. Note that the matrix entries shown in FIG. 9 only reflect corresponding gain elements and do not equal those corresponding gain elements. Values for matrix entries are between 0 and 1 and increase/decrease in 0.1 increments. A value of 1 is an attenuation of 0 db (decibel). Each gain value decrement of 0.1 below i represents a 3 db attenuation, thus, a gain value of 0.1 equals an attenuation of 27 db. A value of 0 represents infinite attenuation. In an exemplary application of the user interface of FIG. 9, clicking with the left mouse button can be used, for example, to increase a gain element by one step, while the right button of the mouse decreases a gain element by one step. In this application, the middle button of the mouse is used to toggle the value of the gain elements between 1 and 0.

The user-interface of FIG. 10 shows a user interface when the audio bridge of the invention is used in a multimedia environment. The user interface of FIG. 10 also assumes that the conference is conducted in a peer-to-peer mode, i.e., each participant can control the gain elements associated with the output that he/she receives from the bridge. On each user's display is shown a still or motion image of the other participants in the conference. Below the image of each participant is a "Talk" button 1001 and a slider control 1002. A user can toggle talk button 1001 on or off, to enable or disable transmission of his or her voice to the person whose image is over the talk button 1001. A participant uses slider control 1002 below a person's image, to adjust up and down the incoming audio volume from that person. Advantageously, the user interfaces of FIGS. 9 and 10 are simple, intuitive, and fully implement the Talk and Listen matrices of the Gain matrix described above.

While some aspects of the present invention have been described as a linearly controlled system only, the amplitude or gain applied to the input signals from a participant could also be non-linearly controlled so that the dynamic surge from all input signals is more consistent. Additionally, the principles of the invention could also be used to change the frequency response of the input signals, so that participants with selective frequency hearing could better be accommodated.

While the present invention has been described as applied to an analog signal received over separate audio lines, it could also be used utilized with multiplexed analog or digital systems. Hence, input signals received in frequency-division-multiplexed format, or in time-division-multiplexed format using either an electrical or an optical signal format can also be changed using the principles of the present invention.

The foregoing is to be construed as only being an illustrative embodiment of this invention. Persons skilled in the art can easily conceive of alternative arrangements providing functionality similar to this embodiment without any deviation from the fundamental principles or the scope of this invention.

What is claimed is:

1. A communications bridge for use in teleconferencing comprising:
   a plurality of input paths for carrying input signals;
   a plurality of output paths for carrying output signals; and
   a data means including a plurality of data items, each data item representing a gain element having a coupling characteristic between one of said plurality of input paths and one of said plurality of output paths such that output signals on each output path is a combination of the coupling of each input signal to that output path as specified by its respective data item.

2. The invention of claim 1 wherein the coupling characteristic includes amplitude of signals from at least one of the plurality of input paths.

3. The invention of claim 1 wherein the coupling characteristic includes gain elements associated with crosspoints of an input path with one or more output paths.

4. The invention of claim 1 wherein the coupling characteristic includes at least one gain element.

5. The invention of claim 3 wherein an output signal O carried on a particular output path i is defined by $$O_i = \sum_{j=1}^{j=n} I_j G_{ij},$$

where n represents the number of input paths, G represents the gain elements, i represents an output path, O represents the output signal of the output path, and I represents the input signals for each one of the input paths.

6. A communications bridge for use in teleconferencing comprising:
   a matrix of input and output communications paths through which flow respectively, input signals and output signals; and
   means for changing one or more characteristics of the input signals coupled to an output communications path such that the output signals flowing out of each output communications path represent a selected combination of the input signals from the input communications paths, including the changed input signals.

7. The invention of claim 6 wherein the one or more characteristics include the input signals' amplitude.

8. The invention of claim 6 wherein the characteristics include gain elements associated with crosspoints of the input and output communications paths.

9. The invention of claim 8 wherein the output signals for a particular output communications path are defined by $$O_i = \sum_{j=1}^{j=n} I_j G_{ij},$$

where n represents the number of input communications paths, G represents the gain elements, i represents a particular output path, O represents the output signals for the particular output path, and I represents the input signals from each input communications path.

10. The invention of claim 6 further comprising:
    means for adding for a particular output communications path, the input signals from each input communications path weighted by the gain element associated with the intersection of each input communications path with the particular output communications path.

11. The invention of claim 6 wherein the input and output communications paths are logical communications paths.

12. A communications bridge for use in teleconferencing comprising
    a matrix of input and output communication paths through each one of which flow respectively, input signals and output signals, wherein each combination of a) one of the input communication paths, and b) at least one of the output communication paths is associated with a participant of a teleconference; and means for controlling at least one of a plurality of gain elements associated with crosspoints of the input and output communications paths to affect the amplitude of the input signals from at least one input communications path such that output signals for each output communications path represent a selected combination of input signals from the input communications paths, including the amplitude-affected input signals.

13. The invention of claim 12 wherein output signals for a particular output communications path are defined by $$O_i = \sum_{j=1}^{j=n} I_j G_{ij},$$

where n represents the number of input communications paths, G represents the gain elements, i represents a particular output communications path, O represents the output signals for the particular output communications path, and I represents the input signals from each input communications path.

14. The invention of claim 12 further comprising means for adding for a particular output communications path, the input signals for the input communications paths wherein, in the addition, the input signals from each input communications path are weighted by the gain element associated with the intersection of each input communications path with the particular output communications path.

15. The invention of claim 12 further comprising means for excluding input signals associated with a particular participant from the output signals flowing through the communications output path associated with the participant.

16. The invention of claim 12 further comprising means for excluding input signals flowing through one or more input communications paths from the output signals flowing through one or more output communications paths.

17. The invention of claim 12 further comprising means for excluding input signals flowing through input communications paths associated with a first group of participants from the output signals flowing through output communications paths associated with a second group of participants; and means for excluding input signals flowing through input communications paths associated with the second group of participants from the output signals flowing through output communications paths associated with the first group of participants.

18. The invention of claim 12 further comprising means for transmitting to one participant at least two different combinations of the input signals from the input communications paths, via two separate output communications paths.

19. A method of connecting multiple participants in a teleconference comprising the steps of:

receiving in a communications data bridge input signals from at least one of a plurality of participants in a teleconference; and means for changing in the bridge at least one characteristic of the input signals from the at least one participant such that the output signals transmitted to the plurality of participants represent a selected combination of the input signals, including the changed input signals.

20. The invention of claim 19 wherein the characteristics of the input signals include the input signals' amplitude.

21. The invention of claim 19 wherein the characteristics include gain elements associated with the input signals received from the at least one participant, and the output signals transmitted to a particular participant.

22. An apparatus comprising:

a matrix defined by a plurality of logical input communications paths crossing a plurality of logical output communications paths, wherein a gain element is associated with each crosspoint of one of said input communications paths and one of said output communications paths;

means for receiving input signals via at least one of the input communications paths;

means for transmitting output signals via at least one of the output communications paths; and a user interface associated with a user terminal connected to the apparatus for controlling the gain elements to affect the input signals' amplitude such that transmitted output signals via at least one of the output communications paths represent a selected combination of the input signals from the at least one input communications paths, including the amplitude-affected input signals.

23. A communications bridge for use in teleconferencing comprising:

a plurality of input paths for carrying input signals;

a plurality of output paths for carrying output signals; and a data means storing a plurality of data items, each data item representing a coupling characteristic of a gain element associated with a crosspoint of at least one of said input paths and at least one of said output paths.

* * * * *